US011034871B2

United States Patent
Itano et al.

(10) Patent No.: US 11,034,871 B2
(45) Date of Patent: Jun. 15, 2021

(54) COMPOSITION CONTAINING REFRIGERANT AND APPLICATION OF SAID COMPOSITION

(71) Applicant: DAIKIN INDUSTRIES, LTD., Osaka (JP)

(72) Inventors: Mitsushi Itano, Osaka (JP); Shun Ohkubo, Osaka (JP); Hitomi Kuroki, Osaka (JP); Tatsumi Tsuchiya, Osaka (JP); Kenji Gobou, Osaka (JP)

(73) Assignee: DAIKIN INDUSTRIES, LTD., Osaka (JP)

(*) Notice: Subject to any disclaimer, the term of this patent is extended or adjusted under 35 U.S.C. 154(b) by 0 days.

(21) Appl. No.: 16/497,536

(22) PCT Filed: Apr. 19, 2018

(86) PCT No.: PCT/JP2018/016070
§ 371 (c)(1),
(2) Date: Sep. 25, 2019

(87) PCT Pub. No.: WO2018/194113
PCT Pub. Date: Oct. 25, 2018

(65) Prior Publication Data
US 2020/0109326 A1 Apr. 9, 2020

(30) Foreign Application Priority Data
Apr. 21, 2017 (JP) .............................. JP2017-084532

(51) Int. Cl.
*C09K 5/04* (2006.01)
*C10M 107/24* (2006.01)
(Continued)

(52) U.S. Cl.
CPC ........... *C09K 5/045* (2013.01); *C10M 107/24* (2013.01); *C10M 107/32* (2013.01);
(Continued)

(58) Field of Classification Search
CPC ............................ C09K 5/045; C09K 2205/22
See application file for complete search history.

(56) References Cited

U.S. PATENT DOCUMENTS 5,185,094 A * 2/1993 Shiflett ............... A62D 1/0057
252/67
8,168,077 B2  5/2012 Spatz
(Continued)

FOREIGN PATENT DOCUMENTS

EP   0 811 670    12/1997
JP   3-170585     7/1991
(Continued)

OTHER PUBLICATIONS

International Search Report dated Jul. 24, 2018 in International (PCT) Application No. PCT/JP2018/016070.
(Continued)

*Primary Examiner* — John R Hardee
(74) *Attorney, Agent, or Firm* — Wenderoth, Lind & Ponack, L.L.P.

(57) ABSTRACT

This invention provides a composition comprising a refrigerant, the composition being non-flammable like R404A (R125/R134a/R143a=44/4/52 wt %), and having a refrigerating capacity that can replace that of R404A, a COP that is equal or superior to that of R404A, and a GWP of 1500 or less. Specifically, the invention provides a composition comprising a refrigerant, the refrigerant comprising a mixture of fluorinated hydrocarbons, the mixture comprising difluoromethane (R32), pentafluoroethane (R125), and 1,1,1,2-tetrafluoroethane (R134a) at specific concentrations, the fluorinated hydrocarbons contained in the mixture having a specific composition ratio. This composition is for use as an alternative refrigerant for R22 or an alternative refrigerant for R404A.

9 Claims, 5 Drawing Sheets

(51) Int. Cl.
*C10M 107/32* (2006.01)
*C10M 107/34* (2006.01)
*C10N 40/30* (2006.01)

(52) U.S. Cl.
CPC ..... *C10M 107/34* (2013.01); *C09K 2205/122* (2013.01); *C09K 2205/22* (2013.01); *C09K 2205/43* (2013.01); *C10M 2209/043* (2013.01); *C10M 2209/1023* (2013.01); *C10M 2209/1033* (2013.01); *C10N 2040/30* (2013.01); *F25B 2400/00* (2013.01)

(56) References Cited

U.S. PATENT DOCUMENTS

| | | | |
|---|---|---|---|
| 2012/0228541 A1* | 9/2012 | Takigawa | C10M 171/008 252/68 |
| 2015/0291869 A1 | 10/2015 | Boussand | |
| 2016/0369144 A1 | 12/2016 | Tsuchiya et al. | |
| 2017/0174967 A1 | 6/2017 | Itano et al. | |

FOREIGN PATENT DOCUMENTS

| | | |
|---|---|---|
| JP | 6-503828 | 4/1994 |
| JP | 9-324175 | 12/1997 |
| JP | 10-219237 | 8/1998 |
| JP | 2869038 | 12/1998 |
| JP | 2013-529703 | 7/2013 |
| JP | 5689068 | 3/2015 |
| JP | 2015-172193 | 10/2015 |
| JP | 2016-502582 | 1/2016 |
| WO | 92/11339 | 7/1992 |
| WO | 2010/059677 | 5/2010 |
| WO | 2011/163117 | 12/2011 |
| WO | 2015/083834 | 6/2015 |
| WO | 2016/132818 | 8/2016 |

OTHER PUBLICATIONS

Extended European Search Report dated Dec. 10, 2020 for the corresponding European Application No. 18788421.8.

* cited by examiner

COMPOSITION CONTAINING REFRIGERANT AND APPLICATION OF SAID COMPOSITION

TECHNICAL FIELD

The present invention relates to a composition containing a refrigerant and to use of the composition.

BACKGROUND ART

Fluorinated hydrocarbons that contain no chlorine in their molecular structure, such as difluoromethane ($CH_2F_2$, R32, boiling point: −52° C.), pentafluoroethane ($CF_3CHF_2$, R125, boiling point: −48° C.), 1,1,1-trifluoroethane ($CF_3CH_3$, R143a, boiling point: −47° C.), 1,1,1,2-tetrafluoroethane ($CF_3CH_2F$, R134a, boiling point: −26° C.), 1,1-difluoroethane ($CHF_2CH_3$, R152a, boiling point: −24° C.), and 2,3,3,3-tetrafluoropropene ($CF_3CF=CH_2$, 1234yf, boiling point: −29° C.), have been used as refrigerants for air conditioners, refrigerating machines, refrigerators, and other similar equipment.

Among such fluorinated hydrocarbons, a ternary mixed refrigerant of R32/R125/R134a in which their proportions are 23/25/52 wt % (R407C), a ternary mixed refrigerant of R125/143a/R134a in which their proportions are 44/52/4 wt % (R404A), etc., have been proposed, and R404A is currently widely used as a refrigerant for freezing and refrigerated storage (for example, Patent Literature (PTL) 1 and 2).

However, the global warming potential (GWP) of R404A is as extremely high as 3922, and is known to be even higher than that of $CHClF_2$ (R22, GWP=1810), which is a chlorine-containing fluorinated hydrocarbon. There is thus a demand to develop, as an alternative refrigerant for R404A, refrigerants that have a refrigerating capacity equal to that of R404A, a ratio of refrigerating capacity to power consumed in a refrigeration cycle (coefficient of performance (COP)) equal or superior to that of R404A, a low GWP, a low compressor outlet temperature, and performance of non-flammable refrigerants (ASHRAE non-flammability (class 1 refrigerants defined in ANSI/ASHRAE 34-2013)), as with R404A.

There are still many refrigerating machines that use $CHClF_2$ (R22) as chlorine-containing fluorinated hydrocarbons (HCFCs), which were used as refrigerants for freezing and refrigerated storage before the use of R404A; however, under the Montreal Protocol, HCFCs are required to be abolished by 2020 in developed countries and to be phased out in a stepwise manner (first: 10%, second: 35%) in developing countries. For these refrigerating machines, there is also a demand to develop, as alternative refrigerants for R22, refrigerants that have a compressor outlet pressure equal to that of R22 used in a refrigeration cycle ("R22 retrofit refrigerants"), a low GWP, and performance of non-flammable refrigerants (ASHRAE non-flammability (class 1 refrigerants defined in ANSI/ASHRAE 34-2013)), as with R22.

There are, for example, PTL 3 and PTL 4 as other prior art relating to the present invention.

CITATION LIST

Patent Literature

PTL 1: JP2869038B
PTL 2: U.S. Pat. No. 8,168,077
PTL 3: JP5689068B
PTL 4: JP2013-529703A

SUMMARY OF INVENTION

Technical Problem

As alternative refrigerants for R404A, PTL 3 and PTL 4 report refrigerant compositions comprising difluoromethane (R32), pentafluoroethane (R125), 2,3,3,3-tetrafluoropropene (1234yf), and 1,1,1,2-tetrafluoroethane (R134a). However, no one has succeeded in developing a refrigerant composition that has a refrigerating capacity equal to that of R404A, a COP equal to or superior to that of R404A, a low GWP, a compressor outlet temperature of 130° C. or lower, and ASHRAE non-flammability performance.

An object of the present invention is to provide a composition comprising a refrigerant, the composition having a refrigerating capacity equal to that of R404A, which has currently been widely used, a COP equal or superior to that of R404A, a GWP of 1500 or less, a compressor outlet temperature of 130° C. or lower, and ASHRAE non-flammability performance. Another object of the present invention is to provide a composition comprising a refrigerant, the composition having a compressor outlet pressure equal to that of R22 and ASHRAE non-flammability performance.

Solution to Problem

The present inventors conducted extensive research to achieve the above object, and consequently found that the object can be achieved by a composition comprising a refrigerant comprising difluoromethane (R32), pentafluoroethane (R125), and 1,1,1,2-tetrafluoroethane (R134a) at specific concentrations. The present invention has been completed based on these findings.

More specifically, the present invention provides the invention according to the following embodiments.

Item 1. A composition comprising a refrigerant, the refrigerant comprising a mixture of fluorinated hydrocarbons, the mixture comprising difluoromethane (R32), pentafluoroethane (R125), and 1,1,1,2-tetrafluoroethane (R134a) in amounts such that the sum of the concentrations thereof is 99.5 wt % or more, the composition ratio of the fluorinated hydrocarbons contained in the mixture falling within a quadrilateral having, as vertices, the following four points in a ternary composition diagram in which the sum of the concentrations of R32, R125, and R134a is 100 wt %:
point G (R32/R125/R134a=25.5/12.7/61.8 wt %),
point T (R32/R125/R134a=24.9/9.3/65.8 wt %),
point R (R32/R125/R134a=19.5/4.3/76.2 wt %), and
point I (R32/R125/R134a=17.5/9.8/72.7 wt %),
the composition being for use as an alternative refrigerant for R22 or R404A.

Item 2. The composition comprising a refrigerant according to Item 1,
the refrigerant comprising a mixture of fluorinated hydrocarbons, the mixture comprising R32, R125, and R134a in amounts such that
the sum of the concentrations thereof is 99.5 wt % or more, the composition ratio of the fluorinated hydrocarbons contained in the mixture falling within a quadrilateral having, as vertices, the following four points in a ternary composition diagram in which the sum of the concentrations of R32, R125, and R134a is 100 wt %:
point G' (R32/R125/R134a=25.2/11.4/63.4 wt %),
point T (R32/R125/R134a=24.9/9.3/65.8 wt %), point R (R32/R125/R134a=19.5/4.3/76.2 wt %), and
point I' (R32/R125/R134a=17.9/8.7/73.4 wt %).

Item 3. The composition according to Item 1 or 2, wherein the mixture further comprises water.

Item 4. The composition according to any one of Items 1 to 3, further comprising at least one substance selected from the group consisting of tracers, compatibilizing agents, ultraviolet fluorescent dyes, stabilizers, and polymerization inhibitors.

Item 5. The composition according to Item 1 or 2, wherein the mixture consists only of R32, R125 and R134a.

Item 6. The composition according to any one of Items 1 to 5, wherein the composition further comprises a refrigerant oil and is for use as a working fluid for refrigerating machines.

Item 7. The composition according to Item 6, wherein the refrigerant oil contains at least one member selected from the group consisting of polyalkylene glycol (PAG), polyol ester (POE), and polyvinyl ether (PVE).

Item 8. The composition according to any one of Items 1 to 7, which is used for at least one member selected from the group consisting of refrigerators, freezers, water coolers, ice makers, refrigerated showcases, freezing showcases, freezing and refrigerating units, refrigerating machines for freezing and refrigerating warehouses, chillers (chilling units), turbo refrigerating machines, and screw refrigerating machines.

Item 9. A refrigeration method comprising operating a refrigeration cycle using the composition of any one of Items 1 to 7.

Item 10. A method of operating a refrigerating machine, the method comprising operating a refrigeration cycle using the composition of any one of Items 1 to 7.

Item 11. A refrigerating machine comprising the composition of any one of Items 1 to 7.

Advantageous Effects of Invention

The composition comprising a refrigerant of the present invention comprises a mixture comprising difluoromethane (R32), pentafluoroethane (R125), and 1,1,1,2-tetrafluoroethane (R134a) at specific concentrations. This composition is for use as an alternative refrigerant for R22, which is an HCFC refrigerant, or as an alternative refrigerant for R404A (R125/R134a/R143a=44/4/52 wt %), which is a mixed refrigerant. Further, the composition has a refrigerating capacity almost equal to that of R404A, a COP equal or superior to that of R404A, a GWP of 1500 or less, and ASHRAE non-flammability performance. Such a composition comprising a refrigerant of the present invention is suitable for use as a working fluid used in a refrigeration method that comprises operating a refrigeration cycle.

BRIEF DESCRIPTION OF DRAWINGS

FIG. 1 shows the concentration of a mixture contained in the composition comprising a refrigerant of the present invention (a quadrilateral surrounded by points G, T, R and I) in a ternary composition diagram of R32, R125, and R134a.

FIG. 2 shows the concentration of a mixture having a GWP of 1500 or less, a compressor outlet temperature of 147.5° C. or lower, and a refrigerating capacity of 107.5% or more of that of R404A (a triangle surrounded by points O, P, and, Q) in a ternary composition diagram of R32, R125, and R134a.

FIG. 3 shows the relationship between Examples of the present invention and Comparative Examples in a tertiary composition diagram of R32, R125, and R134a.

FIG. 4 shows the relationship between P: ASHRAE non-flammable border line and P': ASHRAE non-flammable border line in which allowable ranges are taken into consideration, in a ternary composition diagram of R32, R125, and R134a.

DESCRIPTION OF EMBODIMENTS

Definition of Terms

In this specification, the term "refrigerant" includes at least compounds that are specified in ISO817 (International Organization for Standardization), and that are given a refrigerant number (ASHRAE number) representing the type of refrigerant with "R" at the beginning; and further includes refrigerants that have properties equivalent to those of such refrigerants, even though a refrigerant number is not yet given. Refrigerants are broadly divided into "fluorocarbon-based compounds" and "non-fluorocarbon-based compounds," in terms of the structure of the compounds. "Fluorocarbon-based compounds" include chlorofluorocarbons (CFC), hydrochlorofluorocarbons (HCFC), and hydrofluorocarbons (HFC). "Non-fluorocarbon-based compounds" include propane (R290), propylene (R1270), butane (R600), isobutane (R600a), carbon dioxide (R744), ammonia (R717), and the like.

The term "composition comprising a refrigerant" used in this specification at least includes:
(1) a refrigerant itself (including a refrigerant mixture);
(2) a composition that can be used for obtaining a working fluid for refrigerating machines by further comprising one or more other components and mixing with at least a refrigerant oil; and
(3) a working fluid for refrigerating machines, containing a refrigerant oil.

Among these three modes, composition (2) is referred to as a "composition comprising a refrigerant" in this specification to distinguish it from a refrigerant itself (including a mixture of refrigerants).

In this specification, when the term "alternative" is used in the context in which the first refrigerant is replaced with the second refrigerant, the first type of "alternative" means that equipment designed for operation using the first refrigerant can be operated using the second refrigerant under optimum conditions, optionally with changes of only a few parts (at least one member of the refrigerant oil, gasket, packing, expansion valve, dryer, and other parts) and equipment adjustment. In other words, this type of alternative means that the same equipment is operated with an alternative refrigerant. Embodiments of this type of "alternative" include "drop-in alternative," "nearly drop-in alternative," and "retrofit," in the order in which the extent of changes and adjustment necessary for replacing the first refrigerant with the second refrigerant is smaller.

The term "alternative" also includes the second type of "alternative" that means that equipment designed for operation using the second refrigerant is operated for the same use as the existing use with the first refrigerant, using the second refrigerant. This type of alternative means that the same use is achieved with an alternative refrigerant.

In the present specification, the term "refrigerating machine (refrigerator)" refers to machines in general that draw heat from an object or space to make its temperature lower than the temperature of ambient air, and maintain the low temperature. In other words, refrigerating machines refer to conversion machines that gain energy from the outside to do work; and that perform energy conversion, in order to transfer heat from where the temperature is lower to where the temperature is higher.

In terms of the composition comprising a refrigerant of the present invention, the refrigerant comprises a mixture of fluorinated hydrocarbons, and the mixture comprises difluoromethane (R32), pentafluoroethane (R125), and 1,1,1,2-tetrafluoroethane (R134a) in amounts such that the sum of the concentrations thereof is 99.5 wt % or more.

The composition ratio of the fluorinated hydrocarbons contained in the mixture falls within a quadrilateral having, as vertices, the following four points in a ternary composition diagram in which the sum of the concentrations of R32, R125, and R134a is 100 wt % (FIG. 1):
point G (R32/R125/R134a=25.5/12.7/61.8 wt %),
point T (R32/R125/R134a=24.9/9.3/65.8 wt %),
point R (R32/R125/R134a=19.5/4.3/76.2 wt %), and
point I (R32/R125/R134a=17.5/9.8/72.7 wt %).

The composition comprising a refrigerant of the present invention is for use as an alternative refrigerant of R22, which is an HCFC refrigerant, or an alternative refrigerant for R404A (R125/R134a/R143a=44/4/52 wt %), which is a mixed refrigerant.

The composition comprising a refrigerant of the present invention has a non-flammability similar to that of R404A, and has a refrigerating capacity that can replace that of R404A, a COP that is equal or superior to that of R404A, and a GWP of 1500 or less. More specifically, since the composition comprising a refrigerant of the present invention is non-flammable according to ASHRAE (details of the definition, etc., are described later) like R404A, the composition of the present invention is safer than flammable refrigerants and can be used in a wide range of applications.

Because the GWP is 1500 or less, the composition of the present invention can notably reduce the burden on the environment from a global warming perspective, compared with other general-purpose refrigerants. Further, it is preferable to set the GWP to 1475 or less since a burden on the environment can be furthermore reduced. Moreover, since the composition of the present invention is non-flammable according to ASHRAE, it is safer than flammable refrigerants and can be used in a wide range of applications.

The refrigerating capacity of the composition of the present invention can replace that of R404A. More specifically, the refrigerating capacity is 76.5% or more, preferably 80% or more, and more preferably 85% or more, relative to that of R404A. R404A is a refrigerant currently widely used as a refrigerant for freezing and refrigerated storage, and the composition comprising a refrigerant of the present invention can be an alternative composition for a conventionally known refrigerant composition comprising R404A.

In terms of inhibiting deterioration of the unit or the refrigerant oil, the compressor outlet temperature in the refrigeration cycle is preferably 130° C. or lower.

The COP may be equal or superior to that of R404A (100% or more), but is preferably 105% or more, more preferably 107.5% or more, still more preferably 110% or more, and particularly preferably 112% or more, relative to that of R404A.

In the mixture contained in the composition comprising a refrigerant of the present invention, the compressor outlet pressure in a refrigeration cycle is preferably equal to that of R22 (R22 retrofit). R22 was widely used as a refrigerant for freezing and refrigerated storage before the spread of R404A. Many refrigerating machines using R22 as a refrigerant still remain. However, R22 will be abolished in developed countries in 2020 due to the regulation of HCFC, and there is thus a strong demand for alternative refrigerants. It is essential for alternative refrigerants for refrigerating machines using R22 that the compressor outlet pressure, which is the maximum pressure in a refrigeration cycle, is equal to that of R22. The compressor outlet pressure is preferably 110% or less, and more preferably 100% or less, relative to that of R22.

In the composition comprising a refrigerant of the present invention, the refrigerant comprises a mixture of fluorinated hydrocarbons, and the mixture may consist only of three basic components, i.e., difluoromethane (R32), pentafluoroethane (R125), and 1,1,1,2-tetrafluoroethane (R134a).

Mixture of Fluorinated Hydrocarbons

In a composition comprising a refrigerant according to an example of embodiments of the present invention (embodiment 1), the refrigerant comprises a mixture of fluorinated hydrocarbons, and the mixture comprises difluoromethane (R32), pentafluoroethane (R125), and 1,1,1,2-tetrafluoroethane (R134a) in amounts such that the sum of the concentrations thereof is 99.5 wt % or more.

The composition ratio of the fluorinated hydrocarbons contained in the mixture falls within a quadrilateral having, as vertices, the following four points in a ternary composition diagram in which the sum of the concentrations of R32, R125, and R134a is 100 wt % (FIG. 1):
point G (R32/R125/R134a=25.5/12.7/61.8 wt %),
point T (R32/R125/R134a=24.9/9.3/65.7 wt %),
point R (R32/R125/R134a=19.5/4.3/76.2 wt %), and
point I (R32/R125/R134a=17.5/9.8/72.7 wt %).

This composition is for use as an alternative refrigerant for R22, which is an HCFC refrigerant, or as an alternative refrigerant for R404A, which is a mixed refrigerant.

Figure 1:
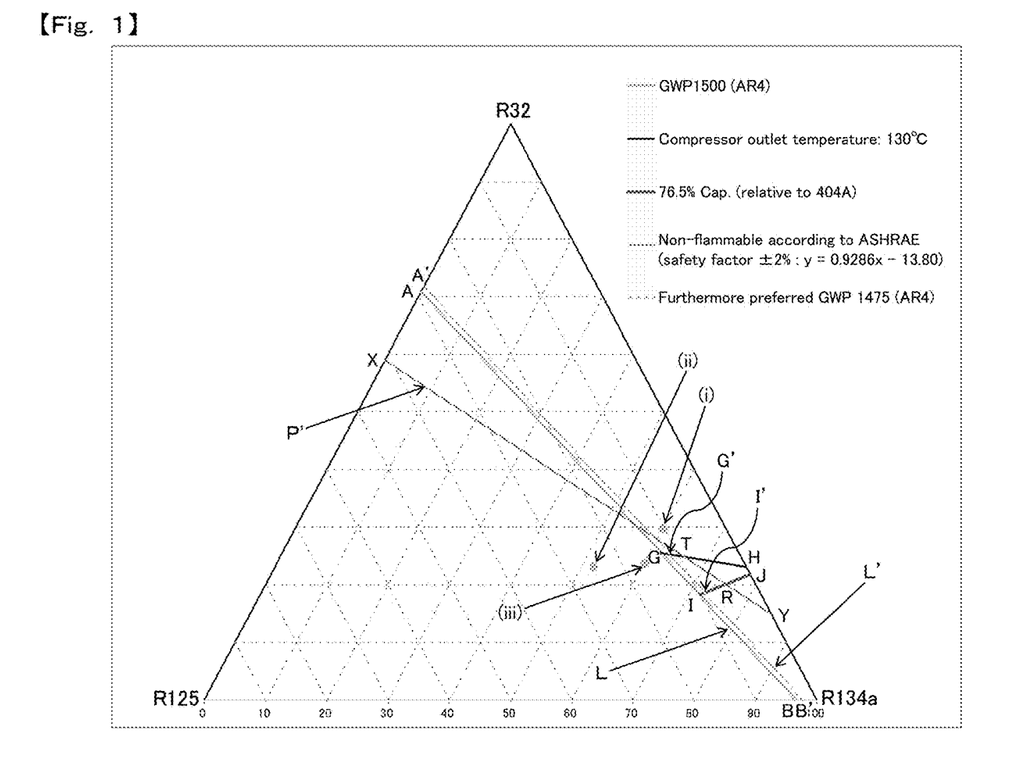

In embodiment 1, a straight line (P') passing through two points, i.e., point T and point R, denotes an ASHRAE non-flammable border line when the allowable range (allowable concentration) is set to ±2.0% in the production of R32, R125, and R134a; and a straight line (L) passing through two points, i.e., point G and point I, denotes a line indicating a composition ratio in which GWP is 1500. Further, a straight line passing through two points, i.e., point I and point R, denotes a line indicating a composition ratio in which the refrigerating capacity is 76.5%, relative to R404A, and a straight line passing through two points, i.e., point G and point T, denotes a line at which the compressor outlet temperature is 130° C.

The quadrilateral surrounded by points G, T, R, and I represents a region that has a GWP of 1500 or less, shows ASHRAE non-flammability in which safety factors are taken into consideration, and has a compressor outlet temperature of 130° C. or lower, and a refrigerating capacity of 76.5% or more of that of R404A.

In embodiment 2, a composition comprises a refrigerant, the refrigerant comprises a mixture of fluorinated hydrocarbons, and the mixture comprises R32, R125, and R134a in amounts such that the sum of the concentrations thereof is 99.5 wt % or more.

The composition ratio of the fluorinated hydrocarbons contained in the mixture falls within a quadrilateral having, as vertices, the following four points in a ternary composition diagram in which the sum of the concentrations of R32, R125, and R134a is 100 wt % (FIG. 1):
point G' (R32/R125/R134a: 25.2/11.4/63.4 wt %),
point T (R32/R125/R134a=24.9/9.3/65.8 wt %), point R (R32/R125/R134a=19.5/4.3/76.2 wt %), and point I' (R32/R125/R134a=17.9/8.7/73.4 wt %).

This composition is for use as an alternative refrigerant for R22, or an alternative refrigerant for R404A, which is a mixed refrigerant.

In embodiment 2, point G' indicates a composition ratio in which GWP=1475 (straight line L' in FIG. 1), based on AR4, and in which the compressor outlet temperature is 130° C. Further, point I' indicates a composition ratio in which GWP=1475, based on AR4, and in which the refrigerating capacity is 76.5% of that of R404A.

The quadrilateral surrounded by points G', T, R, and I' represents a region that has a GWP of 1475 or less, shows ASHRAE non-flammability in which safety factors are taken into consideration, and that has a compressor outlet temperature of 130° C. or lower and a refrigerating capacity of 76.5% or more of that of R404A.

To achieve an improved refrigerating capacity, the following embodiment 3 is particularly preferred.

In embodiment 3, a composition comprises a refrigerant, and the refrigerant comprises a mixture of fluorinated hydrocarbons. The composition ratio of the fluorinated hydrocarbons contained in the mixture falls within a triangle having, as vertices, the following three points in a ternary composition diagram in which the sum of the concentrations of R32, R125, and R134a is 100 wt % (FIG. 2):
point 0 (R32/R125/R134a=47.5/20.7/31.8 wt %),
point P (R32/R125/R134a=38.1/17.3/44.6 wt %), and
point Q (R32/R125/R134a=43.1/6.8/50.1 wt %).

This composition comprising a refrigerant is for use as an alternative refrigerant for R404A, which is a mixed refrigerant.

In embodiment 3, point 0 and point Q indicate a composition ratio in which GWP=1500, based on AR4.

Figure 2:
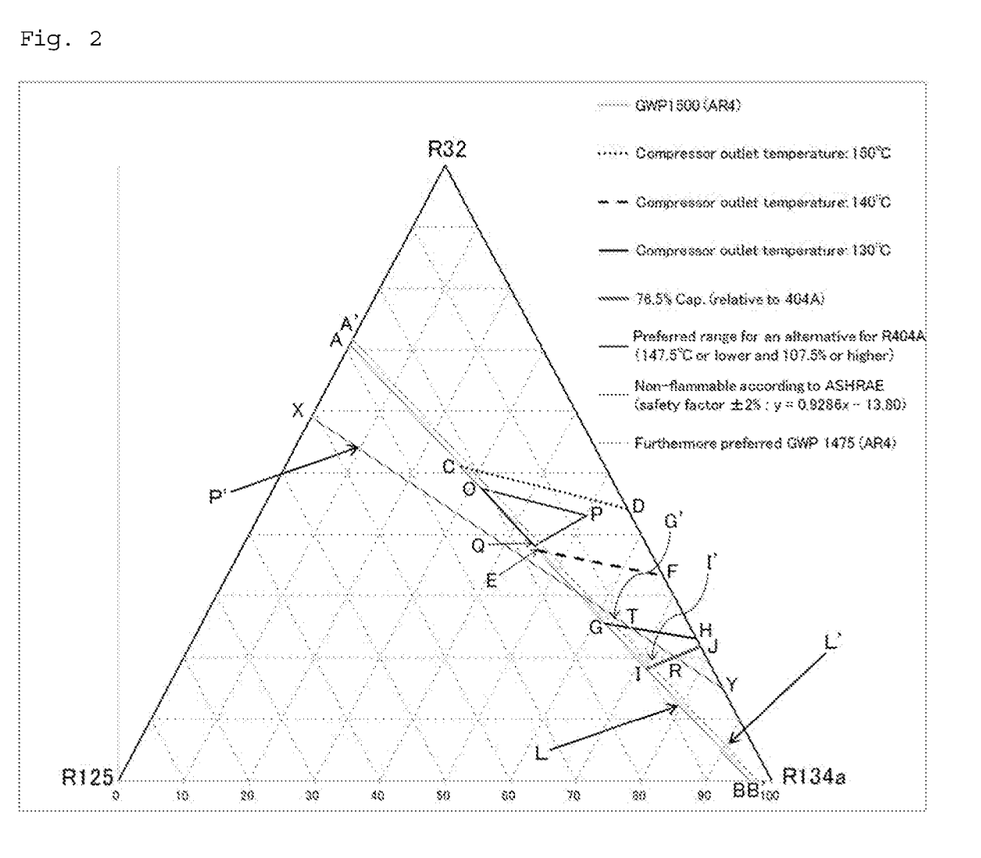

The triangle surrounded by points O, P, and Q represents a region that has a GWP of 1500 or less, a compressor outlet temperature of 147.5° C. or lower, and a refrigerating capacity of 107.5% or more of that of R404A.

Although the details are described later, in FIG. 1, the straight line P' passing through two points, i.e., point X and point Y, denotes an ASHRAE non-flammable border line when the allowable range (allowable concentration) is set to ±2.0% in the production of R32, R125, and R134a; a straight line L passing through two points, i.e., point A and point B, denotes a line indicating a composition ratio in which GWP is 1500, based on AR4; and a straight line passing through two points, i.e., point I and point J, denotes a line indicating a composition ratio in which the refrigerating capacity is 76.5% of that of R404A.

The technical meaning of each point in FIG. 1 to FIG. 4 is described in detail below.

Figure 4:
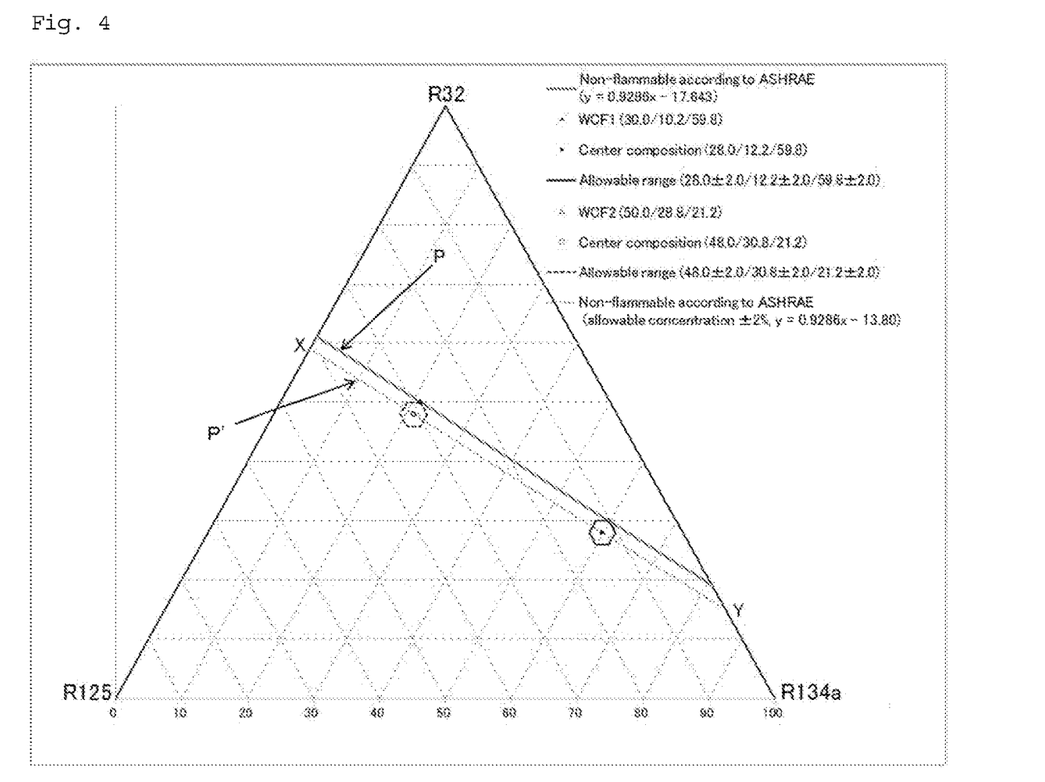

In FIG. 4, when the wt % of R32=x, the wt % of R125=y, and the wt % of R134a=z, a line segment indicating an ASHRAE non-flammable border line is approximated by a line segment represented by the following equations.

ASHRAE non-flammable border line: Line segment P of FIG. 4

$$y=0.9286x-17.643$$

$$z=100-x-y$$

$$19.0 \leq x \leq 61.0$$

The ASHRAE flammability classification of refrigerants is described below.

The ASHRAE flammability classification of refrigerants is performed based on ANSI/ASHRAE Standard 34-2013. Refrigerants classified as Class 1 are non-flammable refrigerants. That is, the composition comprising a refrigerant of the present invention being non-flammable according to ASHRAE means that the mixture comprising fluorinated hydrocarbons used in the present invention (in particular, the three basic components) is classified as Class 1 in the flammability classification.

More specifically, a leak test during storage, transportation, and use is performed based on ANSI/ASHRAE 34-2013 to specify the worst case of fractionation for flammability (WCFF). When the WCFF composition can be identified as being non-flammable in a test based on ASTM E681-09 (a standard test method for concentration limits of flammability of chemicals (vapors and gases)), it is classified as Class 1.

In FIG. 1, the R125 side from the line segment XY is classified as a mixed refrigerant that is non-flammable according to ASHRAE, whereas the R32 side from the line segment XY is classified as a mixed refrigerant that is flammable according to ASHRAE (Class 2: slightly flammable mixed refrigerants, Class 3: flammable mixed refrigerants).

However, in the production of a mixed refrigerant, an allowable range (including allowable error) is set for each refrigerant. Thus, even if the center composition of the mixed refrigerant is on the R125 side from the line segment XY of FIG. 1, when the allowable ranges are not all on the R125 side from the line segment XY, the mixed refrigerant is not defined as a mixed refrigerant that is non-flammable according to ASHRAE.

For example, in the case where R32=28.0 w %±2.0 wt %, R125=12.2 wt %±2.0 wt %, and R134a=59.8 wt %±2.0 wt %, all of the allowable ranges are on the R125 side from the line segment XY as shown in FIG. 4, and thus, a mixed refrigerant in which these allowable ranges are set is classified as a mixed refrigerant that is non-flammable according to ASHRAE. In the case where R32=48.0 wt %±2.0 wt %, R125=30.8 wt %±2.0 wt %, and R134a=21.2 wt %±2.0 wt %, the allowable ranges are all on the R125 side from the line segment XY as shown in FIG. 4, and thus, a mixed refrigerant in which these allowable ranges are set is classified as a mixed refrigerant that is non-flammable according to ASHRAE.

When the allowable range of R32 is set to ±2.0 wt %, the allowable range of R125 is set to ±2.0 wt %, and the allowable range of R134a is set to ±2.0 wt %, the range in which all of the allowable ranges are on the R125 side from the line segment XY is regarded as the ASHRAE non-flammable border line in which the allowable ranges are taken into consideration. FIG. 4 shows the details.

In FIG. 4, the worst case of fractionation (WCF) denotes the most flammable point within the allowable ranges. When the center composition is (28.0/12.2/59.8), then the WCF is (30.0/10.2/59.8) on the line segment P. When the center composition is (48.0/30.8/21.2), then the WCF is (50.0/28.8/21.2) on the line segment P. Accordingly, when the allowable range of R32 is set to ±2.0 wt %, the allowable range of R125 is set to ±2.0 wt %, and the allowable range of R134a is set to ±2.0 wt %, the allowable ranges are all non-flammable according to ASHRAE on a straight line that passes through the center composition (28.0/12.2/59.8) and (48.0/30.8/21.2). This straight line has the same inclination as the ASHRAE non-flammable formula, i.e., 0.9286. The equations that represent a line passing through these center compositions represent the ASHRAE non-flammable border line in which the allowable ranges are taken into consideration, and is approximated by the following equations.

ASHRAE non-flammable border line in which the allowable ranges are taken into consideration: a straight line passing through two points, i.e., point X and point Y (line segment P' of FIGS. 1 to 4)

$$y=0.9286x-13.80$$

$$z=100-x-y$$

$$14.9 \le x \le 59.0$$

Figure 3:
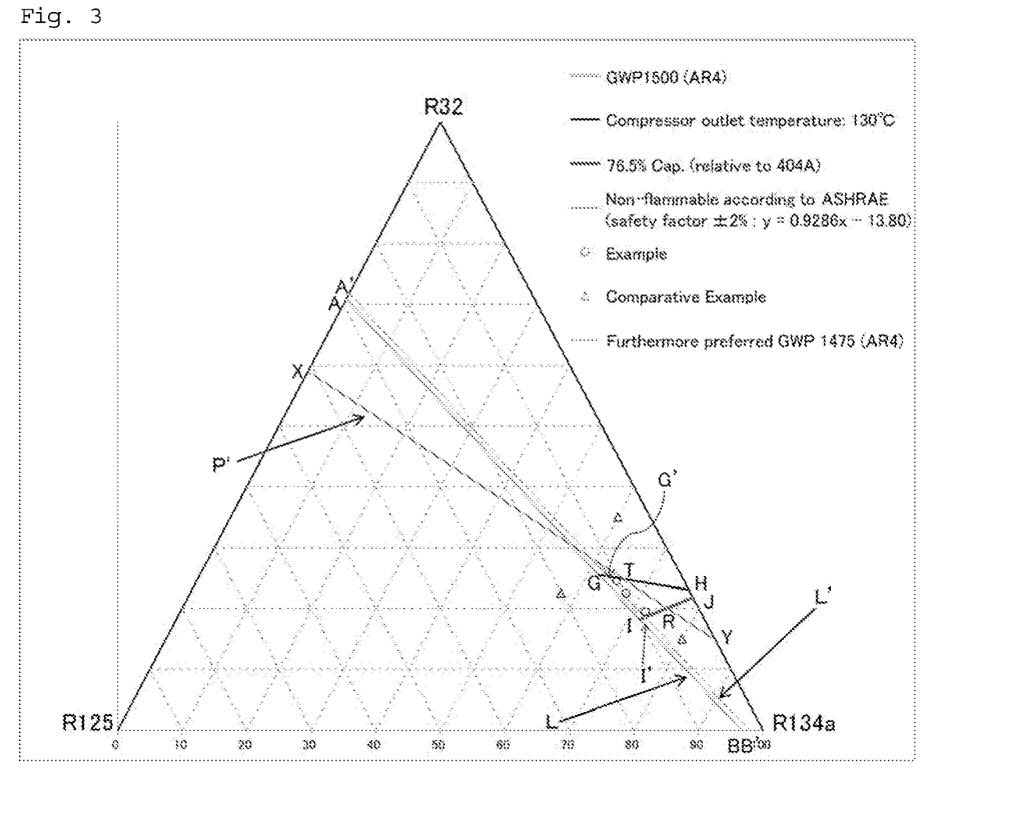

In FIGS. 1 to 3, when the wt % of R32=x, the wt % of R125=y, and the wt % of R134a=z, a line segment indicating a composition ratio in which GWP=1500 or GWP=1475 is approximated by a line segment represented by the following equations.

A line segment indicating a composition ratio in which GWP=1500: a straight line passing through two points, i.e., point A and point B (line segment L of FIGS. 1 to 3

$$y=0.3644x+3.400$$

$$z=100-x-y$$

$$0 \le x \le 70.8$$

A line segment indicating a composition ratio in which GWP=1475: a straight line passing through two points, i.e., point A' and point B' (line segment L' of FIGS. 1 to 3)

$$y=0.3644x+2.20$$

$$z=100-x-y$$

$$0 \le x \le 71.7$$

In addition, a line segment indicating a composition ratio in which the refrigerating capacity is 76.5% relative to that of R404A is approximated by a line segment represented by the following equations. The intersection with the ASHRAE non-flammable border line in which the allowable ranges are taken into consideration (y=0.9286x−13.80) is shown below.

A line segment indicating a composition ratio in which the refrigerating capacity is 76.5% relative to that of R404A: a straight line passing through two points, i.e., point I and point J (line segment IJ of FIGS. 1 to 3)

$$y=-2.80x+58.80$$

$$z=100-x-y$$

$$17.5 \le x \le 21.0$$

The intersection with the ASHRAE non-flammable border line in which the allowable range is taken into consideration is represented by R=(19.2/4.3/76.2) (point R of FIGS. 1 to 3). Further, the intersection with the line in which GWP=1475 is represented by I'=(17.9/8.7/73.4).

Further, a line segment indicating a composition ratio in which the compressor outlet temperature is 130° C., 140° C., or 150° C. is approximated by a line segment represented by the following equations. The intersection with the ASHRAE non-flammable border line in which the allowable range is taken into consideration (y=0.9286x−13.80) is shown below.

A line segment indicating a composition ratio in which the compressor outlet temperature is 130° C.: a straight line passing through two points, i.e., point G and point H (line segment GH of FIGS. 1 to 3)

$$y=5.2917x-122.24$$

$$z=100-x-y$$

$$23.1 \le x \le 25.5$$

The intersection with the ASHRAE non-flammable border line in which the allowable range is taken into consideration is represented by T=(24.9/9.3/65.8) (point T of FIGS. 1 to 3).

Further, the intersection with GWP=1475 is represented by G'=(25.2/11.4/63.4).

A line segment indicating a composition ratio in which the compressor outlet temperature is 140° C.: a straight line passing through two points, i.e., point E and point F (line segment EF of FIG. 2)

$$y=4.1463x-138.07$$

$$z=100-x-y$$

$$33.3 \le x \le 37.4$$

A line segment indicating a composition ratio in which the compressor outlet temperature is 150° C.: a straight line passing through two points, i.e., point C and point D (line segment CD of FIG. 2)

$$y=3.2353x-143$$

$$z=100-x-y$$

$$44.2 \le x \le 51.0$$

Components Other than the Three Basic Components

The mixture contained in the composition comprising a refrigerant of the present invention may further contain a tiny amount of water in addition to the three basic components (R32, R125, and R134a). The amount of water is preferably 0.1 wt % or less, per 100 wt % of the mixture. In one embodiment, the mixture contained in the composition comprising a refrigerant of the present invention consists only of the basic three components and water. When the mixture contains a tiny amount of water, the double bonds in the molecules of unsaturated fluorinated hydrocarbons that may be contained in the composition comprising a refrigerant can be stably present, and oxidation of unsaturated fluorinated hydrocarbons is less likely to occur, resulting in improved stability of the mixture and the composition comprising a refrigerant.

The mixture contained in the composition comprising a refrigerant of the present invention may contain other component(s) (fluorinated hydrocarbon(s)) that are different from the three basic components) in addition to the three basic components (R32, R125, and R134a). The fluorinated hydrocarbon(s) as other component(s) are not limited, and, are, for example, at least one fluorinated hydrocarbon selected from the group consisting of HCFC-1122, HCFC-124, CFC-1113, and 3,3,3-trifluoropropyne.

The mixture contained in the composition comprising a refrigerant of the present invention may contain, in addition to the three basic components (R32, R125, and R134a), at least one halogenated organic compound represented by formula (1): $C_mH_nX_p$, wherein each X independently represents a fluorine atom, a chlorine atom, or a bromine atom, m is 1 or 2, 2m+2≥n+p, and p≥1, as other component(s). The at least one halogenated organic compound as other component(s) is not limited. Preferable examples include difluorochloromethane, chloromethane, 2-chloro-1,1,1,2,2-pentafluoroethane, 2-chloro-1,1,1,2-tetrafluoroethane, 2-chloro-1,1-difluoroethylene, trifluoroethylene, and the like.

The mixture contained in the composition comprising a refrigerant of the present invention may contain, in addition to the three basic components (R32, R125, and R134a), at least one organic compound represented by formula (2):

$C_mH_nX_p$, wherein each X independently represents an atom that is not a halogen atom, m is 1 or 2, $2m+2 \geq n+p$, and $p \geq 1$, as other component(s). The at least one organic compound as other component(s) is not limited. Preferable examples include propane, isobutane, and the like.

As described above, when the mixture contains other components (fluorinated hydrocarbon(s) that are different from the three basic components), the content of other components in the mixture, whether other components are used singly or in a combination of two or more, is preferably less than 0.5 wt %, more preferably 0.3 wt % or less, and even more preferably 0.1 wt % or less, as the total content amount.

Optional Additives

The composition comprising a refrigerant of the present invention may appropriately comprise various additives in addition to the mixture.

Further, by mixing with at least a refrigerant oil, the composition comprising a refrigerant of the present invention can be used for obtaining a working fluid for refrigerating machines.

Specifically, the working fluid for refrigerating machines can be obtained by mixing together the composition comprising a refrigerant of the present invention with a refrigerant oil used in a compressor of a refrigerating machine. The refrigerant oil is typically contained in an amount of 1 to 50 wt % in the working fluid for refrigerating machines, taking the total amount of the composition comprising a refrigerant of the present invention and the refrigerant oil as 100 wt %.

The refrigerant oil is not limited, and can be suitably selected from typically used refrigerant oils. In this case, refrigerant oils that are superior in improving the miscibility with the mixture and stability of the mixture, for example, are suitably selected as necessary.

More specifically, the refrigerant oil is preferably, for example, at least one member selected from the group consisting of polyalkylene glycols (PAG), polyol esters (POE), and polyvinyl ethers (PVE).

For example, it is possible to use a refrigerant oil with a kinematic viscosity of 5 to 400 cSt at 40° C. The kinematic viscosity within this range is preferred from the standpoint of lubrication.

The composition comprising a refrigerant of the present invention may further contain one or more tracers. The one or more tracers are incorporated in the composition comprising a refrigerant of the present invention at a detectable concentration so that, when the composition comprising a refrigerant of the present invention is diluted, contaminated, or undergoes any other change, the change can be traced. There is no limitation on the tracers. Preferable examples include hydrofluorocarbons (HFC), deuterated hydrocarbons, deuterated hydrofluorocarbons, perfluorocarbons, fluoroethers, brominated compounds, iodinated compounds, alcohols, aldehydes, ketones, nitrous oxide ($N_2O$), and the like. Particularly preferred are hydrofluorocarbons or fluoroethers.

The composition comprising a refrigerant of the present invention may further contain a compatibilizing agent. The type of compatibilizing agent is not limited. Preferable examples include polyoxyalkylene glycol ethers, amides, nitriles, ketones, chlorocarbons, esters, lactones, aryl ethers, fluoroethers, 1,1,1-trifluoroalkans, and the like. Particularly preferred are polyoxyalkylene glycol ethers.

The composition comprising a refrigerant of the present invention may further contain one or more ultraviolet fluorescent dyes. There is no limitation on the ultraviolet fluorescent dyes. Preferable examples include naphthalimide, coumarin, anthracene, phenanthrene, xanthene, thioxanthene, naphthoxanthene, and fluorescein, and derivatives thereof. Either naphthalimide or coumarin, or both are particularly preferable.

The composition comprising a refrigerant of the present invention may further contain a stabilizer, a polymerization inhibitor, etc., if necessary.

Examples of stabilizers include, but are not limited to, (i) aliphatic nitro compounds, such as nitromethane and nitroethane; and aromatic nitro compounds, such as nitrobenzene and nitrostyrene; (ii) ethers, such as 1,4-dioxane; amines, such as 2,2,3,3,3-pentafluoropropylamine and diphenylamine; butylhydroxyxylene, benzotriazole, and the like. The stabilizers can be used singly or in a combination of two or more.

The concentration of the stabilizer varies depending on the type of stabilizer, but can be determined within a range in which the properties of the composition comprising a refrigerant of the present invention are not impaired. The concentration of the stabilizer is generally preferably about 0.01 to 5 parts by weight, and more preferably about 0.05 to 2 parts by weight, per 100 parts by weight of the mixture.

The stability of the mixture can be evaluated by a commonly used method without limitation. Examples of such methods include an evaluation method using the amount of free fluorine ions as an index according to ASHRAE Standard 97-2007, and the like. There is, for example, another evaluation method using the total acid number as an index. This method can be performed, for example, according to ASTM D 974-06.

Examples of polymerization inhibitors include, but are not limited to, 4-methoxy-1-naphthol, hydroquinone, hydroquinonemethyl ether, dimethyl-t-butylphenol, 2,6-di-tert-butyl-p-cresol, benzotriazole, and the like.

The concentration of the polymerization inhibitor is usually preferably 0.01 to 5 parts by weight, and more preferably about 0.05 to 2 parts by weight, per 100 parts by weight of the mixture.

In an example of an embodiment of the present invention, an object can be refrigerated by a method comprising the step of operating a refrigeration cycle using the composition comprising a refrigerant of the present invention. For example, the composition comprising a refrigerant of the present invention can be circulated via a compressor to form the refrigeration cycle.

It is also possible to produce a unit for forming a refrigeration cycle in which the composition comprising a refrigerant of the present invention is circulated via a compressor.

Examples of refrigerating machines that can use the composition comprising a refrigerant of the present invention include, but are not limited to, refrigerators, freezers, water coolers, ice makers, refrigerated showcases, freezing showcases, freezing and refrigerating units, refrigerating machines used, for example, for freezing and refrigerating warehouses, chillers (chilling units), turbo refrigerators, screw refrigerators, and the like.

EXAMPLES

The present invention is described in detail below with reference to Examples. However, the present invention is not limited to the Examples.

Examples 1 to 9 and Comparative Examples 1 to 11

The GWP of each of R404A and mixed refrigerants of R32, R125, and R134a was evaluated based on the values stated in the Intergovernmental Panel on Climate Change (IPCC) fourth report (AR4).

The COP, refrigerating capacity, compressor outlet temperature, and compressor outlet pressure of each of R404A and the mixed refrigerants of R32, R125, and R134a were determined by performing refrigeration cycle theoretical calculations for the refrigerant and mixed refrigerants using the National Institute of Science and Technology (NIST) and Reference Fluid Thermodynamic and Transport Properties Database (Refprop 9.0) under the following conditions.
Evaporation temperature −40° C.
Condensation temperature 40° C.
Superheating temperature 20 K
Supercooling temperature 0 K
Compressor efficiency 70%

In FIG. 3, the formulations of the compositions comprising a refrigerant of the Examples are indicated by circles (o), and the formulations of the compositions comprising a refrigerant of the Comparative Examples are indicated by triangles (Δ).

Tables 1 and 2 show the GWP, COP, and refrigerating capacity calculated based on these results. Regarding the COP and refrigerating capacity, the percentages relative to those of R404A are shown.

The coefficient of performance (COP) was calculated according to the following equation.

Figure 5:
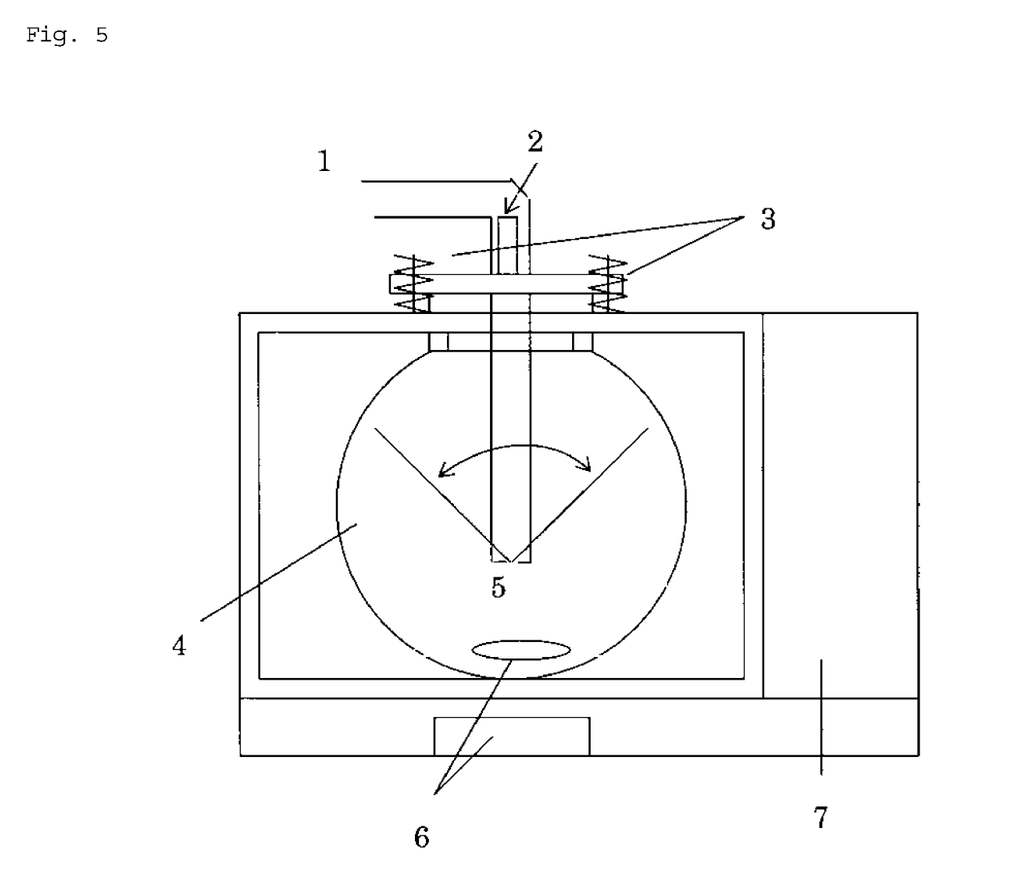
FIG. 5 is a schematic view of a unit used in a flammability test.

COP=(refrigerating capacity or heating capacity)/amount of electrical power consumed The flammability of the mixture of the three basic components used in the composition comprising a refrigerant was evaluated according to U.S. ASHRAE Standard 34-2013. The flammable range was measured using the measurement device of FIG. 5 according to ASTM E681-09.

A 12-L spherical glass flask was used so that the combustion state could be visually observed and photographically recorded. When excessive pressure was generated by combustion, gas was allowed to escape from the upper lid. Ignition was achieved by electric discharge from electrodes disposed at one-third the distance from the bottom.
Test Conditions
Test vessel: 280 mm 9 spherical (internal volume: 12 liters)
Test temperature: 60° C.±3° C.
Pressure: 101.3 kPa±0.7 kPa
Water: 0.0088 g±0.0005 g per gram of dry air
Mixing ratio of composition comprising a refrigerant/air: 1 vol. % increments ±0.2 vol. %
Composition mixture comprising a refrigerant: ±0.1 wt %
Ignition method: AC discharge, voltage: 15 kV, electric current: 30 mA, neon transformer
Electrode spacing: 6.4 mm (¼ inch)
Spark: 0.4 seconds±0.05 seconds
Evaluation criteria: When the flame propagation extends at an angle of 90° or more from the ignition point, it was evaluated as flammable (propagation).

The composition ratio of R32, R125, and R134a (x/y/z wt %) in the non-flammability limit almost satisfied the relationship represented by the following equations (1) to (3).

$$19.0 \leq x \leq 61.0 \tag{1}$$

$$y = 0.9286x - 17.643 \tag{2}$$

$$z = 100 - x - y \tag{3}$$

The results revealed that the composition comprising a refrigerant of the present invention is non-flammable, and causes no combustion, even when mixed with air at any ratio.

TABLE 1

| Item | | Unit | Comparative Example 1 | Comparative Example 2 | Comparative Example 3 Point A | Comparative Example 4 Point B | Comparative Example 5 Point A' |
|---|---|---|---|---|---|---|---|
| Concentration | R32 | mass % | R404A | R22 | 70.8 | 0.0 | 71.7 |
| | R125 | mass % | | | 29.2 | 3.4 | 28.3 |
| | R134a | mass % | | | 0.0 | 96.6 | 0.0 |
| GWP (AR4) | | year | 3922 | 1810 | 1500 | 1500 | 1475 |
| Relative to 404A | Coefficient of performance | (%) | 100 | 117 | 109 | 114 | 109 |
| | Refrigerating capacity | (%) | 100.0 | 104.8 | 164.9 | 53.5 | 165.3 |
| Compressor outlet temperature | | ° C. | 93 | 149 | 161 | 104 | 162 |
| Compressor outlet pressure | | Mpa | 1.82 | 1.53 | 2.46 | 2.46 | 1.09 |
| Flammability according to ASHRAE | | — | Non-flammable | Non-flammable | Flammable | Non-flammable | Flammable |

| Item | | Unit | Comparative Example 6 Point B' | Example 1 Point G | Comparative Example 7 Point H | Example 2 Point I | Comparative Example 8 Point J |
|---|---|---|---|---|---|---|---|
| Concentration | R32 | mass % | 0.0 | 25.5 | 23.1 | 17.5 | 21.0 |
| | R125 | mass % | 2.2 | 12.7 | 0.0 | 9.8 | 0.0 |
| | R134a | mass % | 97.8 | 61.8 | 76.9 | 72.7 | 79.0 |
| GWP (AR4) | | year | 1475 | 1500 | 1256 | 1500 | 1271 |
| Relative to 404A | Coefficient of performance | (%) | 114 | 112 | 114 | 113 | 114 |
| | Refrigerating capacity | (%) | 53.2 | 88.2 | 79.1 | 76.5 | 76.5 |
| Compressor outlet temperature | | ° C. | 104 | 130 | 130 | 123 | 128 |
| Compressor outlet pressure | | Mpa | 1.04 | 1.66 | 1.43 | 1.41 | 1.39 |
| Flammability according to ASHRAE | | — | Non-flammable | Non-flammable | Flammable | Non-flammable | Flammable |

TABLE 2

| Item | | Unit | Example 3 Point T | Example 4 Point R | Example 5 Point G' | Example 6 Point I' | Example 7 |
|---|---|---|---|---|---|---|---|
| Concentration | R32 | mass % | 24.9 | 19.5 | 25.2 | 17.9 | 24.5 |
| | R125 | mass % | 9.3 | 4.3 | 11.4 | 8.7 | 10.5 |
| | R134a | mass % | 65.8 | 76.2 | 63.4 | 73.4 | 55.0 |
| GWP (AR4) | | year | 1435 | 1372 | 1476 | 1475 | 1462 |
| Relative to 404A | Coefficient of performance | (%) | 113 | 114 | 112 | 113 | 113 |
| | Refrigerating capacity | (%) | 85.7 | 76.5 | 87.1 | 76.5 | 85.8 |
| Compressor outlet temperature | | °C. | 130 | 126 | 130 | 123 | 130 |
| Compressor outlet pressure | | Mpa | 1.53 | 1.40 | 1.56 | 1.41 | 1.54 |
| Flammability according to ASHRAE | | — | Non-flammable | Non-flammable | Non-flammable | Non-flammable | Non-flammable |

| Item | | Unit | Example 8 | Example 9 | Comparative Example 9 | Comparative Example 10 | Comparative Example 11 |
|---|---|---|---|---|---|---|---|
| Concentration | R32 | mass % | 22.5 | 20.0 | 22.5 | 35.0 | 15.0 |
| | R125 | mass % | 10.0 | 9.0 | 20.0 | 5.0 | 5.0 |
| | R134a | mass % | 67.5 | 71.0 | 57.5 | 60.0 | 80.0 |
| GWP (AR4) | | year | 1467 | 1465 | 1674 | 1269 | 1420 |
| Relative to 404A | Coefficient of performance | (%) | 113 | 113 | 111 | 113 | 114 |
| | Refrigerating capacity | (%) | 83.0 | 78.5 | 88.0 | 96.2 | 71.5 |
| Compressor outlet temperature | | °C. | 128 | 125 | 126 | 141 | 121 |
| Compressor outlet pressure | | Mpa | 1.50 | 1.44 | 1.59 | 1.66 | 1.33 |
| Flammability according to ASHRAE | | — | Non-flammable | Non-flammable | Non-flammable | Non-flammable | Flammable |

The compositions comprising a refrigerant of Comparative Examples 3, 5, 7, 9 and 11 were all flammable.

Although the compositions comprising a refrigerant of Comparative Example 4 and Comparative Example 6 were non-flammable, these compositions had a refrigerating capacity as low as 53.5% and 53.2%, respectively, relative to that of R404A.

Although the composition comprising a refrigerant of Comparative Example 10 was non-flammable, the GWP was 1674, which is much greater than 1500.

Although the composition comprising a refrigerant of Comparative Example 11 was non-flammable, the compressor outlet temperature was as high as 141° C.

DESCRIPTION OF REFERENCES

A: Composition ratio in which GWP=1500, based on AR4, and the concentration (wt %) of R134a is 0 wt %
B: Composition ratio in which GWP=1500, based on AR4, and the concentration (wt %) of R32 is 0 wt %
A': Composition ratio in which GWP=1475, based on AR4, and the concentration (wt %) of R134a is 0 wt %
B': Composition ratio in which GWP=1475, based on AR4, and the concentration (wt %) of R32 is 0 wt %
C: Composition ratio in which GWP=1500, based on AR4, and the compressor outlet temperature is 150° C.
D: Composition ratio in which the concentration (wt %) of R125 is 0 wt %, and the compressor outlet temperature is 150° C.
E: Composition ratio in which GWP=1500, based on AR4, and the compressor outlet temperature is 140° C.
F: Composition ratio in which the concentration (wt %) of R125 is 0 wt %, and the compressor outlet temperature is 140° C.
G: Composition ratio in which GWP=1500, based on AR4, and the compressor outlet temperature is 130° C.
G': Composition ratio in which GWP=1475, based on AR4, and the compressor outlet temperature is 130° C.
H: Composition ratio in which the concentration (wt %) of R125 is 0 wt %, and the compressor outlet temperature is 130° C.
I: Composition ratio in which GWP=1500, based on AR4, and the refrigerating capacity is 76.5% of that of R404A
I': Composition ratio in which GWP=1475, based on AR4, and the refrigerating capacity is 76.5% of that of R404A
J: Composition ratio in which the concentration (wt %) of R125 is 0 wt %, and the refrigerating capacity is 76.5% of that of 404A
R: Intersection of line segment IJ and line segment XY
T: Intersection of line segment MN, line segment GH, and line segment XY
P: ASHRAE non-flammable border line
P': ASHRAE non-flammable border line when the allowable range (allowable concentration) is set to ±2.0% in the production of R32, R125, and R134a
L: Approximation line segment of line segment indicating GWP=1500
L': Approximation line segment of line segment indicating GWP=1475

The invention claimed is:

1. A composition comprising a refrigerant, wherein the refrigerant comprises a mixture of fluorinated hydrocarbons,
the mixture comprises difluoromethane (R32), pentafluoroethane (R125), and 1,1,1,2-tetrafluoroethane (R134a) in amounts such that the sum of the concentrations thereof is 99.5 wt % or more,
the composition ratio of the fluorinated hydrocarbons contained in the mixture fall within a quadrilateral having, as vertices, the following four points in a ternary composition diagram in which the sum of the concentrations of R32, R125, and R134a is 100 wt %:
point G' (R32/R125/R134a=25.2/11.4/63.4 wt %),
point T (R32/R125/R134a=24.9/9.3/65.8 wt %),
point R (R32/R125/R134a=19.5/4.3/76.2 wt %), and
point I' (R32/R125/R134a=17.9/8.7/73.4 wt %), the composition is an alternative refrigerant for R22 or R404A, the mixture further comprises at least one compound selected from the group consisting of HCFC-1122, HCFC-124, CFC-1113, and chloromethane, and the content of the at least one compound in the mixture is less than 0.5 wt %.

2. The composition according to claim 1, wherein the mixture further comprises water.

3. The composition according to claim 1, wherein the composition further comprises at least one substance selected from the group consisting of tracers, compatibilizing agents, ultraviolet fluorescent dyes, stabilizers, and polymerization inhibitors.

4. The composition according to claim 1, wherein the composition further comprises a refrigerant oil and is for use as a working fluid for refrigerating machines.

5. The composition according to claim 4, wherein the refrigerant oil contains at least one member selected from the group consisting of polyalkylene glycol (PAG), polyol ester (POE), and polyvinyl ether (PVE).

6. The composition according to claim 1, which is used for at least one member selected from the group consisting of refrigerators, freezers, water coolers, ice makers, refrigerated showcases, freezing showcases, freezing and refrigerating units, refrigerating machines for freezing and refrigerating warehouses, chillers (chilling units), turbo refrigerating machines, and screw refrigerating machines.

7. A refrigeration method comprising operating a refrigeration cycle using the composition of claim 1.

8. A method of operating a refrigerating machine, the method comprising operating a refrigeration cycle using the composition of claim 1.

9. A refrigerating machine comprising the composition of claim 1.

* * * * *